United States Patent [19]

Nager, Jr.

[11] Patent Number: 4,821,409
[45] Date of Patent: Apr. 18, 1989

[54] ELECTRICAL CONNECTION APPARATUS FOR FLAT CONDUCTOR CABLES AND SIMILAR ARTICLES

[75] Inventor: Urs F. Nager, Jr., Bethel, Conn.

[73] Assignee: Burndy Corporation, Norwalk, Conn.

[21] Appl. No.: 684,974

[22] Filed: Dec. 21, 1984

Related U.S. Application Data

[63] Continuation of Ser. No. 314,965, Oct. 26, 1981, abandoned.

[51] Int. Cl.⁴ .............................................. B23P 19/04
[52] U.S. Cl. ........................................ 29/747; 29/432.1; 29/512; 29/853; 29/866; 174/71 R; 174/88 R
[58] Field of Search .................... 29/432.1, 512, 747, 29/749, 751, 753, 755, 758, 759, 830, 844, 845, 852, 853, 865, 863, 866; 339/17 B, 17 F, 17 M; 174/48, 71 R, 72 R, 88 R

[56] References Cited

U.S. PATENT DOCUMENTS

| Re. 31,336 | 8/1983 | Weinmann et al. | 339/17 F |
|---|---|---|---|
| 521,825 | 6/1894 | Shipe | 29/522 |
| 916,026 | 3/1909 | Sasseman | 29/278 |
| 2,080,750 | 5/1937 | Thompson | 29/522 |
| 3,133,773 | 5/1964 | Ecker | 339/96 |
| 3,148,356 | 9/1964 | Hedden, Jr. | 29/852 |
| 3,193,921 | 7/1965 | Kahn | 29/512 |
| 3,197,729 | 7/1965 | Sarazen | 339/97 |
| 3,221,095 | 11/1965 | Cook | 339/17 F |
| 3,252,493 | 5/1966 | Smith | 29/512 |
| 3,526,955 | 9/1970 | Cilione | 29/512 |
| 3,924,917 | 12/1975 | Munshower | 339/17 F |
| 4,015,328 | 4/1977 | McDonough | 29/830 |
| 4,066,319 | 1/1978 | Baker et al. | 339/17 F |
| 4,249,304 | 2/1981 | Weinmann et al. | 339/17 F |
| 4,255,612 | 3/1981 | Grundfest | 174/88 R |
| 4,263,474 | 4/1981 | Tennant | 174/84 C |
| 4,315,662 | 2/1982 | Greenwood et al. | 339/17 F |
| 4,348,548 | 9/1982 | Grundfest | 174/88 R |

FOREIGN PATENT DOCUMENTS

| 073395 | 12/1979 | Japan . |
| 56-13739 | 3/1981 | Japan . |
| 57-48833 | 10/1982 | Japan . |
| 58-52623 | 11/1983 | Japan . |
| 1177275 | 1/1970 | United Kingdom . |

OTHER PUBLICATIONS

"Electronic Packaging & Production", Cahners/Kiver Publication, Jan. 1981.
"AMP-Under Carpet Power System"; Product Bulletin 1602-1, AMP, Inc., Harrisburg, PA.

*Primary Examiner*—P. W. Echols
*Attorney, Agent, or Firm*—Perman & Green

[57] ABSTRACT

Electro-mechanical connections for flat conductor cables and similar articles are produced with flanged hollow rivets which puncture the cable or cables to be connected and then are compressed into an eyelet configuration which clamps and is secured to the cable. Apparatus and procedures for achieving this result are disclosed.

8 Claims, 3 Drawing Sheets

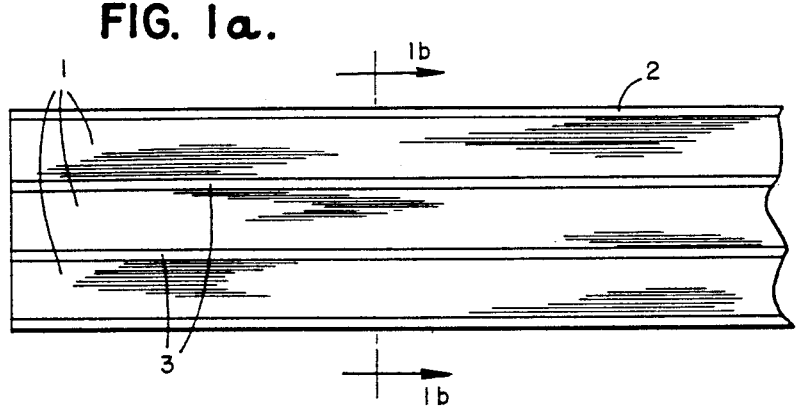
FIG. 1a.
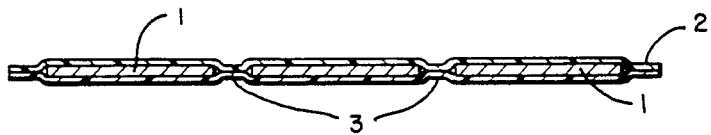
FIG. 1b.
FIG. 2a.      FIG. 2b.
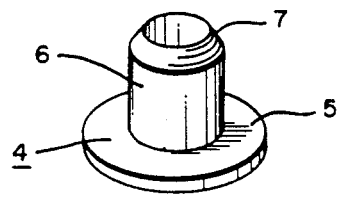 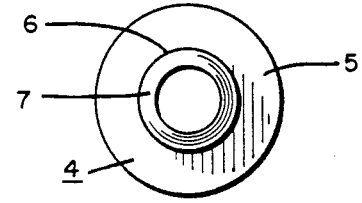
FIG. 3a.      FIG. 3b.
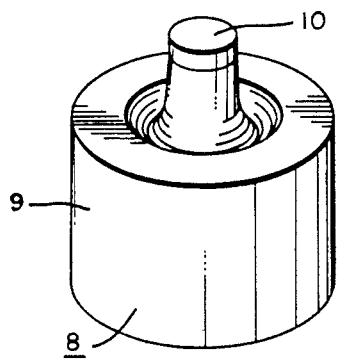 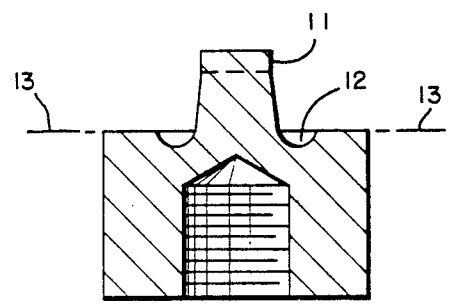

ELECTRICAL CONNECTION APPARATUS FOR FLAT CONDUCTOR CABLES AND SIMILAR ARTICLES

This is a continuation of Ser. No. 314,965, filed Oct. 26, 1981, now abandoned.

BACKGROUND OF THE INVENTION

This invention relates to conductive connectors for electrically joining two or more conducting elements, such as a flat connector cable. This invention further relates to such connectors which function to mechanically secure the conducting elements together at the point of junction.

Flat conductor cables have found acceptance in wiring applications wherein conventional round rubber or plastic-coated wires are undesirably visible due to their location and/or the need for a multitude of wiring connections, such as in an office environment. For example, wires which must traverse a room space are variously hidden within the walls, or tacked to baseboards, or placed under the carpeting. Flat conductor cables solve these problems by being locatable under carpeting or tiling without causing objectionable bulging. They accordingly also eliminate the need in many wiring applications for extensive behind-the-wall electrical installation. In new building construction, duct-work is usually built into the walls and floors of the building going up in order to accommoderate conventional wiring. Therefore, if the choice is made to use flat conductor cables instead of conventional wiring, the inconvenience of including the duct-work at the construction stage is eliminated.

Additionally, this type of cable wiring permits renovations of older buildings having conventional wiring to be made with much more ease. Since the cable wiring may be placed beneath carpets, the new work may be performed by simply connecting by means of transition connections cable wiring with the older, more conventional wiring already in place in the building.

As is known, flat conductor cables comprise multiple strips of very thin conductive material, such as copper, separated from each other in a thin insulating sleeve made from a rubber or a plastic material, for example, polyester. Various thicknesses or gauges are known, with the metal strip being generally about as thick as the top and bottom plastic coverings combined, for example, about 6 to 10 mils. A given cable can comprise from several to a large number of metal strips; the width of a given metal strip will vary from cable to cable, and can generally range from about 0.6 to about 1 inch.

Flat conductor cables can and in many cases must be tapped, spliced, or connected to transition junctions or service modules. A transition junction is simply a connection between a portion of a flat conductor cable wiring system and a conventional wiring system. A service module is a box from which power may be tapped from a flat conductor cable wiring system for direct use by the consumer; a common example of which is a simple electrical outlet. Whereas the insulation of round wires is cut and stripped from the wire to achieve these types of connections, flat conductor cables are joined together by clamp connectors with teeth which typically either project all the way through the cable sandwich of plastic-conductor-plastic, and then into the conducting element to which the cable is to be joined, and then to the other side of the clamp, or they are joined by clamp connectors which penetrate just down to the conductive strip of the cable. The openings through which the connectors are fitted are generally produced by pre-punching the cable with a suitable device to produce the proper size opening for the connector. The procedure generally requires special alignment fixtures to insure that the locations of all taps, splices and other connections are correct.

In the current under-carpet wiring installations which are sold commercially, several different types of clamp connectors must be used depending on the type of connection being made; that is, whether the connection is a tap, splice or transition connection. Once the several steps precedent to the installation of the clamp are accomplished, the clamps are secured to the cable with a gripper tool which is manually operated by the installer.

There is therefore a need for a simple procedure for effecting an electrical connection between flat conducting articles such as cables, and another conducting element, which may be another cable, or for example, a service module or transition connection. Where the connection is to be made on the site of the installation, it is highly desirable that this procedure be accomplished quickly, with a minimum amount of equipment, and with equipment which is relatively portable in nature and easy to handle. Further, because of the inherent advantage of the cable structure, it is desirable that the connections conform as much as possible to the flat cable geometry. In other words, the advantages of cable wiring are reduced considerably if taps, splices and other connections result in bulky projections of the wiring system.

It is further more desirable to provide a flat conductor cable installation system which makes use of one type of connector for all of the various types of connections which must be made. It would additionally be advantageous to provide such a system in which the electro-mechanical connection can be made more physically secure through the imposition of greater amounts of force while retaining excellent electrical connection between the conductor strips of the cable and the connector element itself.

Safety considerations require that all flat conductor cable wiring be protected with an outer shield of grounding metal, such as cold-rolled steel. THis shielding is flat and strip like, as is the cable itself, and averages about 10 mils in thickness. When connections of various types are made with the cable itself, the shielding must frequently be spliced and redirected to follow the operations being performed on the flat conductor cable. It would thus be of further advantage to be able to use the connection arrangement and procedure for flat conductor cables to connect various strips of shielding as well. Since the shielding is electrically conductive, such connections would also have to be electro-mechanical and secure in nature.

SUMMARY OF THE INVENTION

THis invention addresses the aforementioned needs and improves flat conductor cable technology by providing an arrangement and procedure for quickly and conveniently electro-mechanically securing a connection for a flat cable or similar article to another conducting element, making use of equipment which is portable and which produces a strong connection substantially conforming to the flat cable geometry.

The connecting arrangement or apparatus of this invention comprises an electrically conductive flanged malleable or compressible hollow rivet connector, anvil means for cold-forming the rivet connector into an eyelet configuration, and compression means for registering and forcing the rivet connector through a flat conductor cable into contact with the anvil means so as to form an electro-mechanically secure eyelet/flange connection. The connection procedure of this invention requires that the rivet connector possess a hollow pin or post adapted to fit around and over the top portion of a vertical stud on the anvil means. The geometry of the anvil means is such that, after the rivet connector has been forced through the cable structure and over the top of the anvil post, continued movement of the rivet over the anvil post and onto the anvil base forces the hollow post of the rivet to expand outward and eventually to curl or roll around the other side of the opening formed in the cable or cables to be connected, such that an eyelet is formed which clamps the cable structure toward the flange of the rivet.

DESCRIPTION OF THE DRAWINGS

FIG. 1a is a top plan view of a typical flat conductor cable;

FIG. 1b is front cross section of such a cable.

FIG. 2a is a perspective view of a preferred embodiment of the rivet connector of this invention;

FIG. 2b is a top plan view of same looking toward the base or flange portion.

FIG. 3a is a front perspective view of a preferred embodiment of the anvil means of this invention;

FIG. 3b is a front cross section of same.

DETAILED DESCRIPTION OF THE INVENTION

Figure 4:
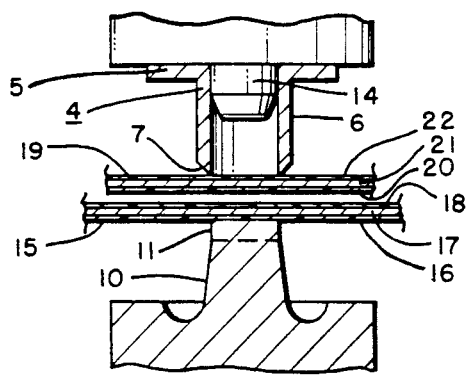
FIG. 4 illustrates the electrical connecting arrangement of this invention just prior to commencement of a procedure for joining two conductor cables.

The connection arrangement or apparatus and procedure of this invention, while capable of broader mechanical application, is specifically designed to be used with flat conductor cable systems. FIGS. 1a and 1b illustrate one example of such a cable. Thin strips of conducting material 1, such as copper, are embedded in, or adheringly surrounded by a thin sleeve 2 of an insulating plastic material, for example, a polyester. The metal strips 1 are separated and insulated from each other by spacings 3 at the edges of the cable and between the metal strips. The top and bottom plastic portions of the sleeve are simply bonded to each other at these points. FIG. 1b is an illustration of the cross section of such a cable with the dimensions of the components somewhat exaggerated for easier illustration. An example of 3-strip flat conductor cable is a Type FCC 12 AWG, 300 volt, 20 amp copper cable sold by Burndy Corporation. As a dimensional example, the thickness of this specific cable is approximately 15 mils across a conductor strip, the copper strip itself being approximately 7 mils, and the insulating plastic being approximately 4 mils at the top and at the bottom. Of course, at the spacings 3 the overall width decreases to about 8 mils of plastic. In any event, the connection arrangement and procedure of this invention is not limited in its scope to any specific gauge or thickness of conductor cable.

As before stated, this invention makes use of a flanged electrically-conductive malleable or compressible rivet connector, a preferred structure of which is illustrated in FIGS. 2a and 2b. The rivet connector 4 consists of a thin disc-shaped flange or base 5 and a vertical post 6. The post 6 and indeed the connector 4 is hollow, wherein the opening in the flange and the hollow or inner diameter of the post are equal. A preferred feature of the connector of this invention is that the post 6 is tapered at or near the top as shown to form a wedge. The tapered portion 7 slopes from the top of the post outward toward the flange portion of the rivet connector. The wedge feature is designed to assist a suitable puncturing and expansion of the flat conductor cable during the connection procedure. this will be described in more detail below. The dimensions of the connector are not critical per se, however, having selected specific types of conducting elements to connect, the practioner of this invention will find that a preferred range of dimensions works best. Thus for example, using the specific type of conductor cable mentioned above, it has been found that excellent connections are produced with a rivet connector having the following dimensions: inner diameter (hollow diameter) of about 166 mils; post wall thickness of about 25 mils; total height of about 248 mils; and a flange diameter of approximately 430–440 mils.

The material of construction of the rivet connector must be compressible or malleable under force in order to be cold-formable into the eyelet shape desired at the end of the procedure. Additionally, of course, the material is preferably electrically conductive to approximately the same extent as the conductivity of the metal strips 1. Obviously the easiest way to match conductivities is to use the same materials; therefore, for copper flat conductor cable it is preferred that the connector element be comprised of copper or a copper alloy. To enhance the connecting procedure, and to reduce or eliminate any tendency for the connector material to adhere to the anvil means, and also for ease of removal of the completed connector from the anvil means, it is preferred that the surface of the connector be coated with lubricating or smooth inorganic or organic material. Suitable materials would include paraffin or smooth metal such as tin or combinations of these.

The exact degree of taper of the wedge at the top of the rivet post is not critical in and of itself, and may in fact vary depending upon the type of flat conductor cable undergoing the connection procedure. Generally however, angles of 40 degrees to 50 degrees have been found to achieve the desired results.

FIGS. 3a and 3b illustrate the anvil means of this invention, the shape and construction of which is considered very important for proper functioning of this invention. The anvil 8 is comprised of a hard pressure-resistant material, such as a polished steel and the relative motion which occurs between the rivet connector 4 and the anvil 8 causes the connector to be formed into the final desired eyelet shape. In a preferred compressing device, which is described and claimed in detail in copending U.S. patent application Ser. No. 06/314,966, filed of even date, assigned to Burndy Corporation, and entitled Apparatus and Method for Installing Electrical Connectors on Flat Conductor Cable, the anvil means 8 is held stationary with respect to the movement of the compressing means and connector. However, it it not critical to this invention which of the connector and anvil means moves with respect to the other. It is the thrusting movement of the one toward the other that is important.

The anvil 8 consists of a relatively thick, disc-like base 9, to which is attached a generally vertical post 10. The upper portion 11, shown extending from the top of post 10 down to the dashed line, is perpendicular with respect to the base and the post thereafter is gently tapered outward until it reaches the base. At that point, the post opens up into a curved, circular well 12 formed in the base. Specifically referring to FIG. 3b, line 13—13 represents the top surface of the anvil base 9, and is shown passing over well 12 and through post 10 for purposes of reference. It is seen that the well 12 is generally of U-shape, and it is clear from FIGS. 3a and 3b that the well surrounds the post 10 where it is connected to the base 9.

The slight outward tapering of anvil post 10 which occurs below upper portion 11 serves several purposes. The taper forces the malleable rivet post placed thereover to expand in an outward direction, such that when the tip of the rivet post reaches well 12, it will begin to expand further outward and around the puncture made in the cable to form the eyelet. Additionally, as the rivet post forces the cut cables ahead of it, the anvil post taper controls the descent of the cables such that the expanding rivet post and the cut cables arrive in the well in proper placement and timing. Further, since there is friction between the cut cable or cables and the tapered portion of the anvil post, it has been found that this friction exerts a cleaning or polishing effect on the conductive strips of the cables to enhance the quality of the electrical connection which is about to be made.

As with the dimensions of the rivet connector 4, the dimensions of the anvil means are not critical in and of themselves. They will depend in large measure upon the parameters selected for the conducting cables or other articles to be joined, the dimensions and materials of construction of the rivet connector to be utilized, and the compressing forces to be used to effect puncture and connection. As an example, using the specific flat conductor cable referred to above, and the specific dimensions given for the copper rivet connector, it has been found that the following anvil dimensions produce excellent connections when utilized with compression forces of about 2500 to 3500 pounds: diameter of the anvil base of about 624 mils; height of the base from the bottom to line 13—13 of about 375 mils; height of the anvil post from line 13—13 to the top of about 174 mils; diameter of the upper, non-tapered portion of the anvil post of about 163 mils; length of post portion 11 of about 44 mils; the angle of outward taper of the anvil post is approximately 2.5° from the normal; the distance from line 13—13 to the bottom of well 12, or in other words the depth of the well is about 19 mils; and the distance across the top of the well from the side of the post to the other side of the well along line 13—13 is from about 38-44 mils.

The sequence of cable puncturing and electromechanical fixation will now be described with reference to FIGS. 4-7. First with respect to FIG. 4, a ram portion 14 of a suitable compression means, such as the means described in the above referred to pending application, holds and registers the rivet connector 4 above anvil means 8 such that the post 6 of the rivet is perfectly concentric with the post 10 of anvil 8. Resting on top of the anvil for purposes of this illustration, are portions of two flat conductor cables which are to be electrically connected, as would occur in a tapping or splicing operation, by the rivet connector 4. Both portions of the two cables contain of course, a conductive metal strip since the object is to electro-mechanically connect the two cables. Therefore, the portion of flat conductor cable 15 resting immediately on anvil 8 comprises a bottom plastic insulating layer 16, a layer of copper conductor 17, and a top layer of insulating plastic 18. Directly above cable 15 is another flat conductor cable 19, the portion immediately over the anvil comprising a bottom plastic layer 20 adjacent to plastic layer 18, a middle copper strip 21, and an upper plastic insulating layer 22.

Figure 5:
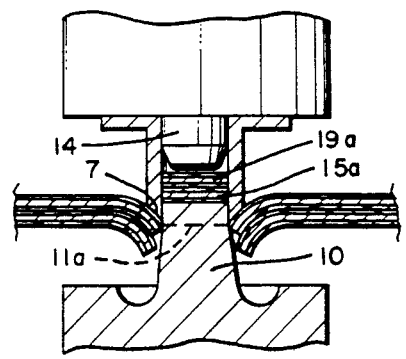
FIG. 5 illustrates the cable puncture phase of the connection procedure.

Referring now to FIG. 5, ram 14 of the compressing means has moved the rivet connector 4 down forcibly against cables 15 and 19. In so doing, the cables have been ruptured and post 6 of rivet connector 4 has slid over the top portion of post 10 of anvil 8. It should be recalled that the inner diameter of the rivet post is just slightly larger than the diameter of the upper portion 11 of the anvil post. This swift downward action results in a rupturing of cables 15 and 19 due to the combined forces of the wedge feature 7 of rivet post 6 and the close resistance fit between the rivet post and the anvil post. Cable portions 15a and 19a are the circular cut out portions caused by this puncturing action. The puncturing is actually completed well before the leading edge of the rivet post has reached the tapered portion of anvil post 10, and it can be seen that the puncturing action of the rivet post also drives the cut portions of cables 15 and 19 before it, down along the anvil post and towards well 12.

Figure 6:
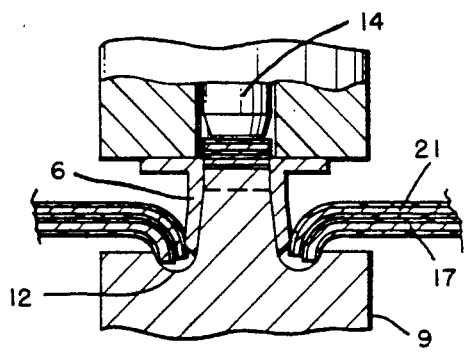
FIG. 6 illustrates the initiation of the coldforming of, and eyelet formation from, the rivet connector.

Referring now to FIG. 6, as the downward stroke of the compression means continues, the leading edge of post 6, still driving the cut portions of the cables ahead of it, enters the tapered area of anvil post 8 and is spread outward as a result thereof. As the leading edge continues and encounters well 12, cold forming of post 6, as defined by the shape of the well, commences.

Figure 7:
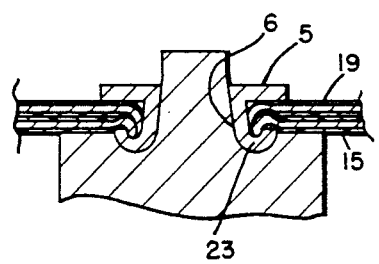
FIG. 7 illustrates the completion of eyelet formation and electro-mechanical connection.

Referring now to FIG. 7, the compression stroke continues to the end, and forces the post 6 of the rivet connector 4 to expand into a rounded eyelet 23, which curls under around and up to clamp the cable sandwich on the underside of 15 in the direction of the flange 5. The downward movement of the cut portions of the cables 15 and 19 is limited by their physical length, and as the post 6 continues to expand around the well, the rivet post material overcomes the advance of the cut portions of the cables which snap up into the enclosure formed by the eyelet and flange portions of the rivet connector. Therefore, together the eyelet portion 23 and the flange 5 form a pinch clamp to mechanically secure the connection and it can be clearly seen that the conductor strip portions 17 and 21 of cables 15 and 19 are in intimate contact with the inside of the eyelet, thus yielding an excellent electrical connection.

As before mentioned, any suitable compression means for forcing the hollow post of the connector over the top of the anvil post, will suffice. Compression forces of between about 2500 and 3500 pounds produce excellent results. Again reference is made to the above mentioned copending U.S. patent application, of Burndy Corporation, the entire contents of which are hereby expressly incorporated herein by reference.

Figure 8A:
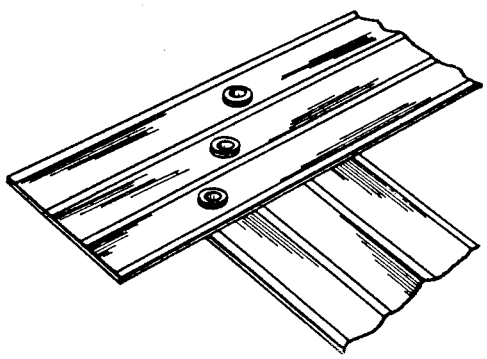
FIG. 8a is a plan view of a finished tapping connection shown from the flange side of the connector.
Figure 8B:
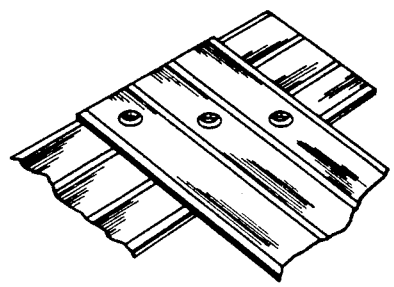
FIG. 8b is a plan view of the other side of the connection.

Referring to FIG. 8a, a finished tap connection of two flat conductor cables accomplished by the connection apparatus of this invention is illustrated, looking at the flange side of the connector. FIG. 8b illustrates this connection from the other side, that is, the eyelet side of the connector. The connector is of course hollow.

Although the connection apparatus and procedure of this invention has been described and illustrated with respect to the joining of two flat conductor cables, such as would occur in a tapping or splicing operation, this invention also embraces within its scope terminal or transition connections, in which the rivet connector is driven through and clamps the top and bottom portion of a single flat conductor cable, or in which the end of the cable is folded upon itself once and the connector driven through the folded over portion. The reason for the latter possibility is to insure good electrical connection by giving the connector two opportunities to pass through the cable.

Figure 9:
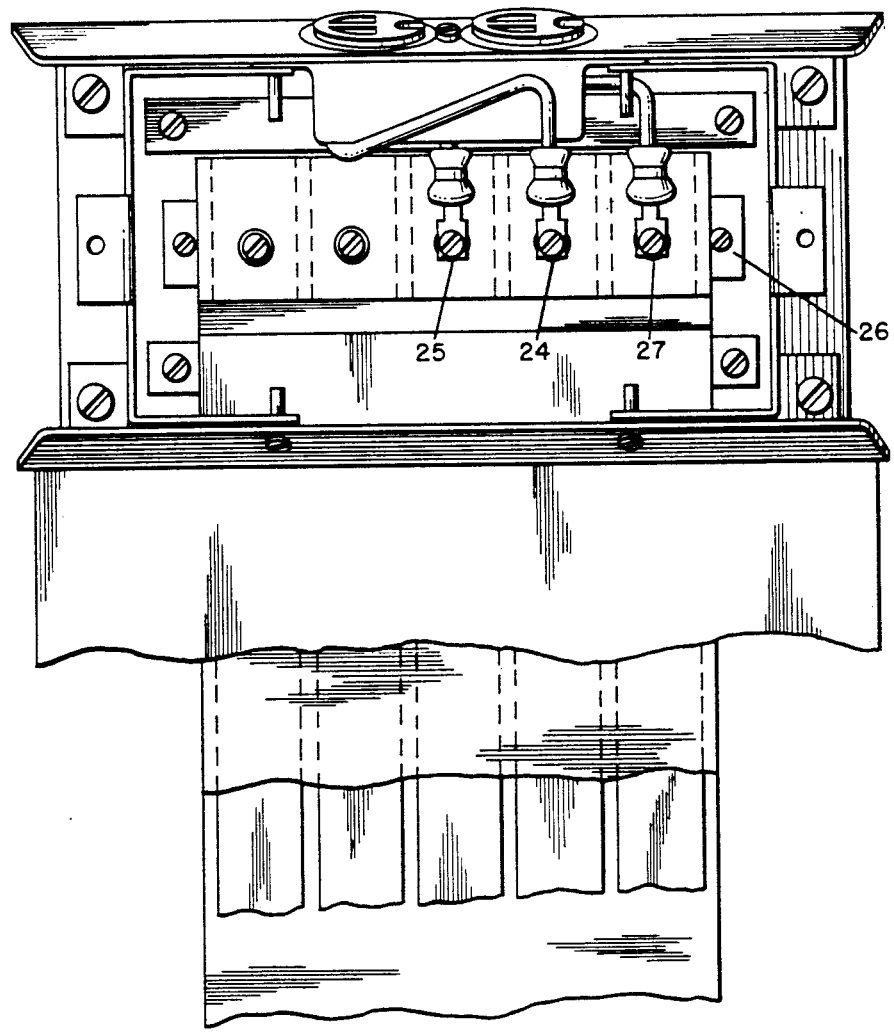
FIG. 9 illustrates the cable connection of this invention used with a screw and lug service module.

A terminal or service module connection is illustrated in FIG. 9, in which proper sized screws 24 have been inserted through the hollow connector openings 25 and into a suitable insulating holding bar 26. Then, for example, lugs 27 from an electrical outlet are placed between the screw and flange portion of the connector to achieve the terminal connection. Alternately, instead of lugs making the connection conventional round wires may be stripped and bent into curved shapes which would be inserted between the screw and flange as with the lugs illustrated. A transition connection would be accomplished in a similar fashion, since, at the transition junction, the cable to be connected is mounted generally on an insulating holding bar, and screws are then inserted into the connector openings similar to that depicted in FIG. 9.

This invention can be utilized to produce electrical connections in other flat conductive articles as well. For example, the steel grounding shields which, as indicated above, are used with flat conductor wiring systems, may be electro-mechanically connected using the connector and apparatus of this invention. Typically, the grounding shield strips are of about 10 mils thickness, and the procedure to utilize the rivet connector of this invention to secure two such shield pieces together would be essentially the same as that detailed for cable connecting. It has been found however that the best electro-mechanical connections between two such conductive sheets of material are produced when a separation layer is placed between the two sheets to be connected. Conveniently enough for under carpet wiring systems, a strip of fabric adhesive would be one example of a separating layer which works quite suitably. Generally, the separating layer which may also be a suitable plastic film should be between 5 and 15 mils in thickness. The separation layer is believed to be responsible for the best eyelet formation when two metal strips are connected using the procedure and apparatus of this invention.

This invention is capable of use quite beyond the specific examples detailed herein, as will be apparent to practioners in the relevant art. Although not described herein, these further applications for making electro-mechanical connections are deemed to be within the scope of this invention.

What is claimed is:

1. Apparatus for quickly and rapidly producing a strong electro-mechanical connection on a flat conductive article, which comprises:
   a. an electrically-conductive compressible rivet connector, having a flange with a circular opening and a hollow cylindrical post circumferentially-joined to the flange at said opening, the top of said post being tapered outward toward said flange;
   b. anvil means comprising a base, a vertical circular post attached thereto, and a curved, circular well immediately surrounding said post at the anvil base, wherein the post is cylindrical at the top and is thereafter uniformly tapered out toward the anvil base; where the inner diameter of the hollow rivet post is greater than the diameter of the top cylindrical portion of the anvil post but less than the diameter of the tapered portion thereof;
   c. compression means for positioning and registering said rivet connector opposite said anvil means in post-to-post concentric facing relationship, wherein said compression means forcibly thrusts said rivet post through a flat conductive article placed between the rivet connector and the anvil, to produce a cut out portion from said flat conductive article, and over said anvil post whereby said rivet post is formed into an eyelet which clamps said flat conductive article between the eyelet and said rivet flange so as to electro-mechanically secure the rivet connector to said flat conductive article.

2. The connection apparatus of claim 1 wherein said rivet connector is comprised of a malleable metal or metal ally.

3. The apparatus of claim 2 wherein the angle of taper at the top of said rivet connector post is between 40° and 50° from the vertical.

4. The apparatus of claim 3 wherein the angle of taper of said anvil post is about 2.5°.

5. Apparatus of claim 1 further including lubricant means on said connector.

6. Apparatus of claim 1 wherein there is friction between said flat conductive article and said anvil post which exerts a cleaning or polishing effect on said flat conductive article whereby the quality of the electrical connection is enhanced.

7. Apparatus of claim 1 wherein said electromechanical connection is produced on a plurality of flat conductive articles placed adjacent one another between said rivet connector and said anvil.

8. Apparatus of claim 1 wherein the difference between said inner diameter of said hollow rivet post and said diameter of the top cylindrical portion of the anvil post is in the order of 0.003 inches.

* * * * *